United States Patent [19]

Ikeda

[11] Patent Number: 4,550,260
[45] Date of Patent: Oct. 29, 1985

[54] APPARATUS FOR CONTROLLING A PULSE GENERATOR

[75] Inventor: Yoshiaki Ikeda, Tokyo, Japan

[73] Assignee: Seikosha Co., Ltd., Tokyo, Japan

[21] Appl. No.: 617,961

[22] Filed: Jun. 7, 1984

[30] Foreign Application Priority Data

Jun. 10, 1983 [JP] Japan ................................ 58-103806

[51] Int. Cl.$^4$ ............................................. H03K 3/00
[52] U.S. Cl. .................................... 307/106; 400/121; 74/395
[58] Field of Search .................. 307/106, 108; 74/395; 474/900; 400/121, 322

[56] References Cited

U.S. PATENT DOCUMENTS 3,734,073  5/1973  Walter et al. ...................... 74/395 X
4,448,553  5/1984  Yonezawa et al. .............. 400/322 X Primary Examiner—Reinhard J. Eisenzopf
Assistant Examiner—T. E. DeBoer
Attorney, Agent, or Firm—Robert E. Burns; Emmanuel J. Lobato; Bruce L. Adams

[57] ABSTRACT

An apparatus for controlling a pulse generator includes a sensor cooperating with a rotary detecting plate for generating a pulse, as for defining the timing for the printing operation. An indexing gear faces one side of the detecting plate, and is formed by a rotary member on which the detecting plate is supported. A plurality of indexing pins are provided on the one side of the detecting plate and engaged with teeth on the indexing gear. The pins are disengageable from those teeth and engageable with other teeth on the indexing gear by rotation of the detecting plate relative to the indexing gear. A spring normally urges the detecting plate in engagement with the indexing gear.

3 Claims, 9 Drawing Figures

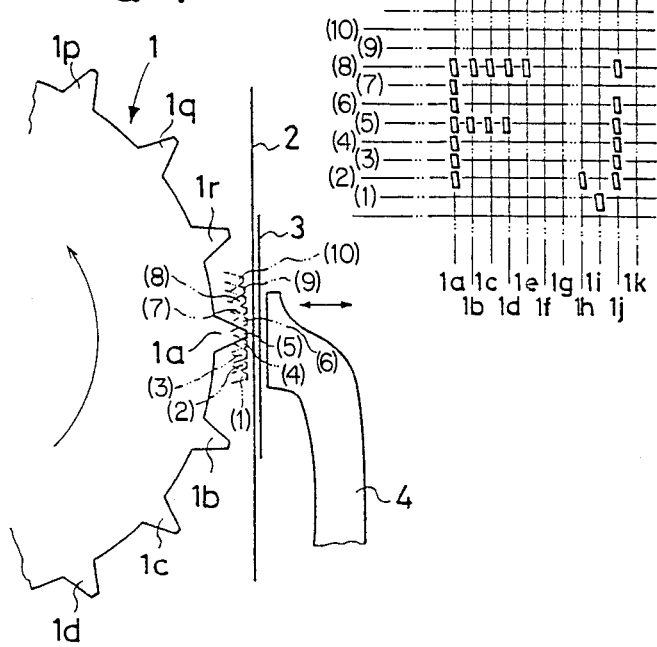
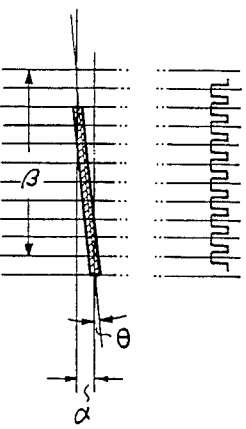
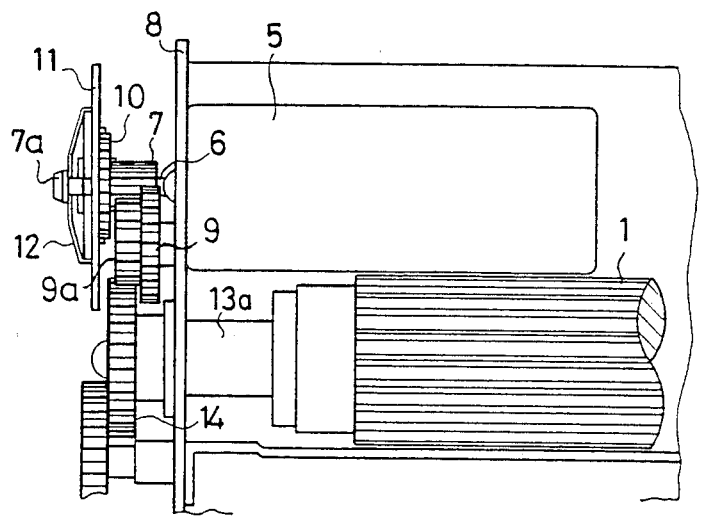

APPARATUS FOR CONTROLLING A PULSE GENERATOR

BACKGROUND OF THE INVENTION

1. Field of the Invention:

This invention relates to an apparatus for controling a pulse generator, such as a pulse generator provided in a printer for generating a printing timing pulse.

2. Description of the Prior Art:

There is a printer which comprises a platen having a plurality of longitudinally extending projections on its outer peripheral surface, and a printing hammer which is movable longitudinally of the platen. The motion of the printing hammer is controlled by a printing timing pulse synchronized with the position of a particular projection on the platen. In order to form an accurately positioned dot, it is necessary to control the phase of any such printing timing pulse. The pulse is generated by a sensor which cooperates with a rotary detecting plate. The sensor is movable to a predetermined extent about the center of the detecting plate. The adjustment of the sensor is effected by loosening a screw for the sensor, displacing the sensor along a guide and tightening the screw again. The necessity for loosening the screw and tightening it again requires a lot of time for the adjustment of the sensor, and makes it a very inefficient job. A large space is required for installing the optical sensor movably around the outer periphery of the rotary detecting plate, and the entire apparatus is, therefore, very large. The sensor is movable only to a limited extent, and sometimes fails to control the printing position. In any such event, it is necessary to change the engagement of a motor pinion, a train of reduction gears and a platen gear. This change requires the use of special jigs, and is, therefore, a costly job. Moreover, it is a complicated job to establish a predetermined relationship between the projections on the platen and the detecting holes in the rotary detecting plate.

SUMMARY OF THE INVENTION

It is an object of this invention to provide an apparatus which enables easy and accurate control of a pulse generator as in a printer. According to this invention, an indexing gear is provided between a rotary detecting plate and a motor shaft, and facilitates fine control.

It is another object of this invention to provide a control apparatus for a pulse generator which is small and compact in construction, and thereby reduces the space required for the installation of the pulse generator as a whole. According to this invention, an optical sensor is stationary, and the rotary detecting plate is rotatable for controlling, for example, the printing position.

The apparatus of this invention facilitates the control of, for example, the printing position over a wide range without any particular limitation. Moreover, it is less costly than any similar apparatus known in the art.

BRIEF DESCRIPTION OF THE DRAWINGS

FIG. 1 is a fragmentary side elevational view of an apparatus embodying this invention;

FIG. 2 is a front elevational view showing the printing operation by way of example;

FIG. 3 is a cross sectional view of a printing hammer;

FIG. 4 is a view showing a signal from an optical sensor;

FIG. 5 is a top plan view of the apparatus;

DETAILED DESCRIPTION OF THE INVENTION

Figure 6:
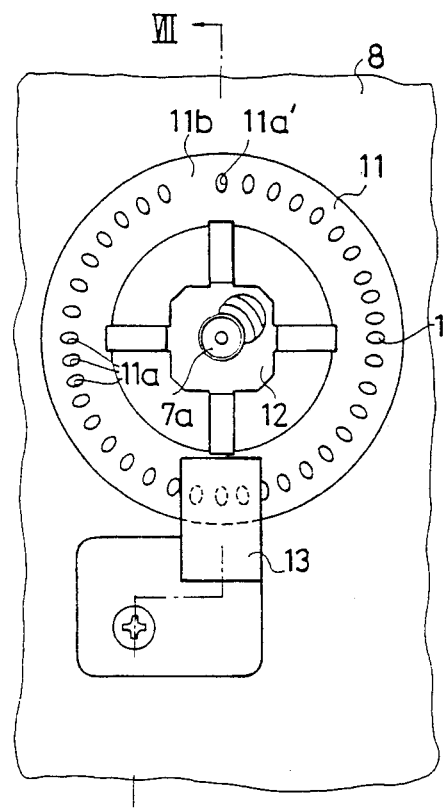
FIG. 6 is a fragmentary enlarged front elevational view of the apparatus.

A platen 1 has 18 longitudinally extending projections on its outer peripheral surface, as shown at 1a to 1r in FIG. 1. A sheet of paper 2 and an ink ribbon 3 are disposed between the platen 1 and a printing hammer 4. The platen 1 is continuously rotatable in the direction of an arrow in FIG. 1. The printing hammer 4 is continuously movable longitudinally of the platen 1 to strike against the platen 1 synchronously with a timing pulse transmitted to the hammer during its movement and print a dot in conjunction with a particular projection on the platen 1. A projection 1a on the platen 1 prints eight dots in a vertical line in accordance with the timing pulses transmitted successively at locations (1) to (8) during its movement with the rotation of the platen 1, as shown in FIGS. 1 and 2. Then, the projection 1b arrives at location (1), and the printing hammer 4 prints dots in another line. The printing hammer 4 is inclined as shown in FIG. 3, and the angle $\theta$ of its inclination is expressed as follows:

$$\theta = \tan \frac{-\alpha}{\beta}$$

in which $\alpha$ stands for the distance between dots longitudinally of the platen 1, and $\beta$ stands for the distance between every two adjoining projections on the platen 1.

FIG. 2 shows the letter "F" printed by way of example. A drive signal is transmitted to the printing hammer at locations (2) to (8), and seven dots are printed by the projection 1a. Two dots are printed by each of the projections 1b to 1d all at locations (5) and (8), and a single dot is printed by the projection 1e at location (8) to complete the formation of the letter "F". The projections 1f and 1g do not print any dots, but leave a space between two adjoining letters. Likewise, the letter "J" is printed by the projections 1h, 1i and 1j, as shown in FIG. 2.

Figure 7:
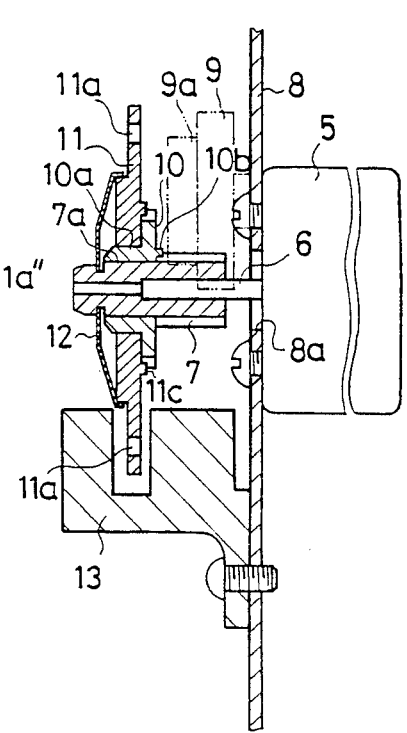
FIG. 7 is a sectional view taken along the line VII—VII of FIG. 6.

Referring to FIGS. 5 and 7, a motor 5 for driving the platen 1 has an output shaft 6 projecting through a hole 8a in a mounting plate 8, and a motor pinion 7 is secured to the shaft 6. A reduction gear 9 is engaged with the motor pinion 7. The platen 1 has a shaft 1a to which a platen gear 14 is secured. The platen gear 14 is engaged with a gear 9a which is coaxial with the reduction gear 9. The rotation of the motor pinion 7 is, therefore, transmitted to drive the platen 1. The motor pinion 7 has a shaft portion 7a on which an indexing gear 10 is rotatably supported. The indexing gear 10 has a shaft portion 10a on which a rotary detecting plate 11 is rotatably supported. A spring 12 is secured to the shaft portion 7a of the motor pinion 7 to hold the rotary detecting plate 11 resiliently against the indexing gear 10. The indexing gear 10 can alternatively be formed as an integral part of the motor pinion 7. The indexing gear 10 has 30 teeth in the example shown in the drawings. The rotary detecting plate 11 has adjacent to its outer periphery a plurality of equally spaced apart detecting holes 11a forming a circle, as shown in FIG. 6. The number of the detecting holes 11a is equal to the number of dots for each row multiplied by an integer, but less two. In the example shown, the plate 11 has 38 holes 11a, and a space 11b occupying two holes is provided in the circular array of the holes 11a. Each hole 11a defines a slit for determining the printing timing for a dot. An optical sensor 13 is secured to the mounting plate 8, and includes a light-emitting element (not shown) and a light-receiving element (not shown), but disposed on the opposite side of the rotary detecting plate 11 from the light-emitting element.

The optical sensor 13 provides a series of signals through 10 detecting holes 11a for a vertical line of dots at locations (1) to (10) for a projection on the platen with its rotation. If 10 holes starting with 11a' in FIG. 6 are, for example, used for detection at locations (1) to (10) for the projection 1a, 10 holes beginning with 11a'' are used for detection at locations (1) to (10) for the projection 1b. The printing hammer 4 is smaller than the distance between every two adjoining projections so that it does not effect printing in conjunction with two projections simultaneously. Eight holes define the printing timing, and two holes define the stop timing.

Figure 8:
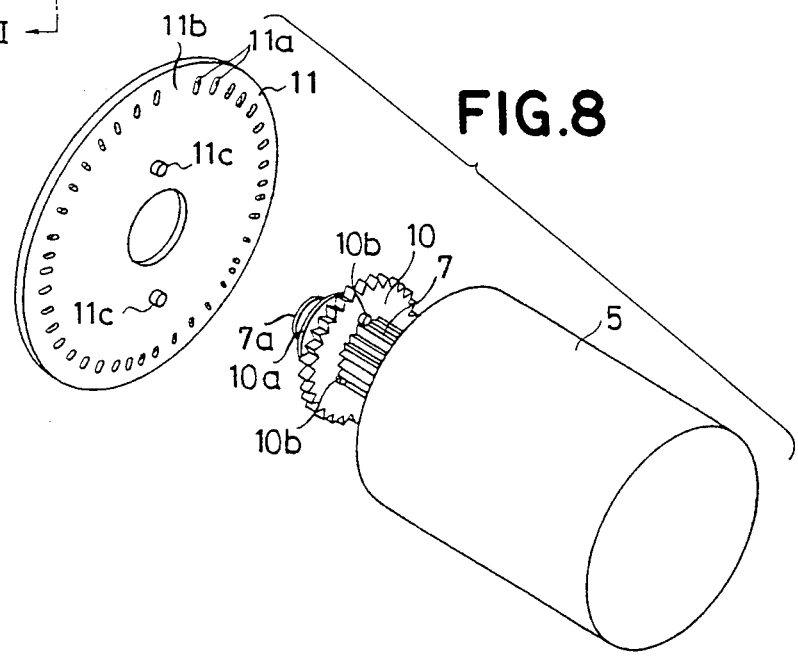
FIG. 8 is an exploded perspective view of the apparatus.

The rotary detecting plate 11 has a pair of indexing pins 11c as shown in FIG. 8. The indexing pins 11c are engageable with the teeth on the indexing gear 10. The spring 12 holds the plate 11 against the indexing gear 10 to keep the indexing pins 11c engaged with the teeth on the indexing gear 10 so that rotation may be transmitted to the plate 11. If the plate 11 is detached from the indexing gear 10 against the force of the spring 12, however, it is possible to adjust the position of the plate 11 relative to the indexing gear 10. The indexing gear 10 has a plurality of pins 10b engaged with the motor pinion 7 so that the rotation of the motor may be transmitted to the indexing gear 10. The pins 10b are not disengageable from the pinion 7, since the spring 12 is disposed in close proximity to the end of the shaft portion 10a of the indexing gear 10.

In the example shown, the indexing gear 10 has 30 teeth having an angular pitch $\theta_2$ of 12°, and the rotary detecting plate 11 has 38 detecting holes or slits 11a having an angular pitch $\theta_1$ of 9° except for the portion 11b. With such parameters the value of $\theta_1/|\theta_1-\theta_2|$ would be an integer. It follows, therefore, that if the engagement of the indexing pins 11c with the indexing gear 10 is shifted by one tooth on the indexing gear 10, the position of the slits 11a is shifted by an amount equal to 40/30 dots relative to the optical sensor 13 to effect timing control. This means that each tooth on the indexing gear 10 enables adjustment corresponding to 4/3 dots. Each projection on the platen enables the printing of 10 dots. Ten dots are equal to (4/3 dots×7 teeth)+2/3 dot. This means that seven teeth enable adjustment for each projection (i.e., for a vertical line of dots) at a location retracted by 2/3 dot. This difference of 2/3 dot is corrected by the succeeding eight teeth, since seven plus eight teeth are equal to 20 dots (4/3 dots×15 teeth). This is the number of the dots printed by two projections. Thus, the apparatus enables fine control of the printing position by an amount Δd of 2/3 dot. Finer control is possible if the pitch of the teeth on the indexing gear and the pitch of the slits in the detecting plate are appropriately altered.

Figure 9:
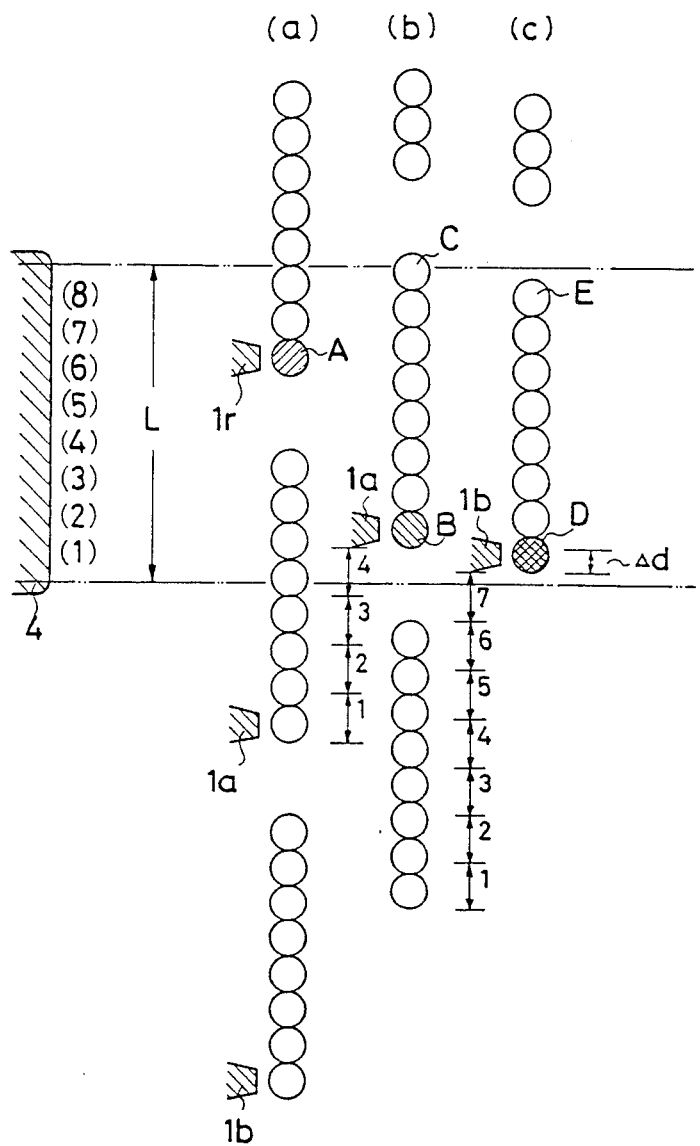
FIG. 9 is a view illustrating the control of the printing position.

The control of the printing position is shown by way of example in FIG. 9. In FIG. 9, the dimension L shows the area in which printing is possible by the printing hammer 4. If a particular projection on the platen is located within the printable area L, the printing of a dot is possible. It is important to acertain first of all the relation between the projections and the printing timing. When the slit 11a' of the detecting plate 11 has been detected by the sensor 13, a drive signal is applied to enable printing at location (1) of the projection 1a. If, for example, a dot A is printed at the projection 1r as shown at (a) in FIG. 9, the projection 1r still stays within the printable area L, and location (1) for the projection 1a is still outside the area L. The detecting plate 11 is moved away from the indexing gear 10 against the force of the spring 12 so that the indexing pins 11c may be disengaged from the teeth on the indexing gear 10. The plate 11 is rotated back for a distance corresponding to four teeth on the indexing gear 10, and the indexing pins 11c are engaged with the indexing gear 10 again. The four teeth correspond to 5⅓ dots. If a drive signal is applied upon detection of the slit 11a' by the sensor 13, a dot B is printed at the projection 1a as shown at (b) in FIG. 9. One-third of a dot C is, however, not printed at location (8) of the projection 1a. Therefore, the plate 11 is disengaged from the indexing gear 10 again, rotated back by a distance corresponding to seven teeth on the indexing gear 10, and engaged with the indexing gear 10 again. The seven teeth correspond to 9⅓ dots. If printing is effected upon detection of the slit 11a' by the sensor 13, a dot D is printed at the projection 1b as shown at (c) in FIG. 9. This means the achievement of fine control for the printing position by a distance which is shown at d in FIG. 9. The dot D has been moved back from the dot B by a distance corresponding to ⅔ dot A dot E is printed at location (8) of the projection 1b. It has been moved back from the dot C by a distance corresponding to ⅔ dot and stays completely within the printable area L.

The pinion on the motor shaft can itself be used as an indexing gear if it has a sufficiently large number of teeth. According to this invention, there is no problem, even if the angular pitch $\theta_2$ of the teeth on the indexing gear 10 is smaller than the angular pitch $\theta_1$ of the slits in the detecting plate 11.

What is claimed is:

1. An apparatus for controlling a pulse generator, comprising:
    a sensor cooperating with a rotary detecting plate for generating a pulse;
    an indexing gear facing one side of said detecting plate and comprised of a rotary member on which said detecting plate is supported;
    a plurality of indexing pins provided on said one side of said detecting plate and engaged with teeth on said indexing gear, said pins being disengageable from said teeth and engageable with different teeth on said indexing gear by rotation of said detecting plate relative to said indexing gear; and
    a spring urging said detecting plate in engagement with said indexing gear.

2. An apparatus as set forth in claim 1, wherein said detecting plate has a plurality of detecting slits having an angular pitch $\theta_1$ which differs from the angular pitch $\theta_2$ of said teeth on said indexing gear.

3. An apparatus as set forth in claim 2, wherein the value of $\theta_1/|\theta_1-\theta_2|$ is an integer.

* * * * *